United States Patent [19]
Shive et al.

[11] Patent Number: 5,855,859
[45] Date of Patent: Jan. 5, 1999

[54] GETTERING AGENT

[75] Inventors: Larry W. Shive, St. Peters; Saeed Pirooz, St. Louis, both of Mo.

[73] Assignee: MEMC Electronic Materials, Inc., St. Peters, Mo.

[21] Appl. No.: 739,550

[22] Filed: Oct. 30, 1996

Related U.S. Application Data

[63] Continuation-in-part of Ser. No. 259,052, Jun. 13, 1994, Pat. No. 5,622,568.

[51] Int. Cl.$^6$ .................................................. C01B 15/14
[52] U.S. Cl. ............................ 423/325; 134/2; 252/181.6
[58] Field of Search ........................... 134/2, 3; 210/506, 210/688, 807, 196, 263; 252/181.6; 423/324, 325

[56] References Cited

U.S. PATENT DOCUMENTS

| | | | |
|---|---|---|---|
| 4,256,587 | 3/1981 | Carnahan et al. | 210/670 |
| 4,337,555 | 7/1982 | Hancock et al. | 423/6 |
| 4,687,573 | 8/1987 | Miller et al. | 210/506 |
| 4,687,581 | 8/1987 | Macedo et al. | 210/670 |
| 4,902,426 | 2/1990 | Macedo et al. | 210/688 |
| 5,164,093 | 11/1992 | Chilton et al. | 210/688 |
| 5,175,110 | 12/1992 | Bradshaw et al. | 210/688 |
| 5,178,768 | 1/1993 | White, Jr. | 210/663 |
| 5,286,464 | 2/1994 | Drogisich | 210/688 |
| 5,405,535 | 4/1995 | Yamamoto | 210/669 |

FOREIGN PATENT DOCUMENTS

| | | |
|---|---|---|
| 0 306 334 | 3/1989 | European Pat. Off. . |
| 61-222592 | 10/1986 | Japan . |

OTHER PUBLICATIONS

Bruening, et al. "Effect of Organic Solvent and Anion Type on Cation Binding Constants with Silica Gel Bound Macrocycles and their Use in Designing Selective Concentrator Columns" Analytical Chemistry, vol. 63, No. 1 (Jan. 1991) pp. 21–24.

R. Kocjan "Additional Purification of Some Salts by Using Silica Gel Modified with Calmagit as a Sorbent" Separation Science & Technology, vol. 27, No. 314 (1992) pp. 409–417.

R. Kocjan, et al. "Calcon–Modified Silica Gel Sorbent. Application to Preconcentration or Elimination of Trace Metals" Talanta, vol. 39, No. 114 (1992) pp. 63–68.

Phelan, et al. "Combined Reagent Purification and Sample Dissolution (CORPAD) Applied to the Trace Analysis of Silicon, Silica and Quartz" Analyst, vol. 109 (Oct. 1984) pp. 1269–1272.

*Primary Examiner*—Scott Kastler
*Attorney, Agent, or Firm*—Senniger, Powers, Leavitt & Roedel

[57] ABSTRACT

A gettering agent for gettering metals from a solution. The gettering agent has a surface layer of $SiO_2$ which is greater than 15 angstroms in thickness.

7 Claims, 2 Drawing Sheets

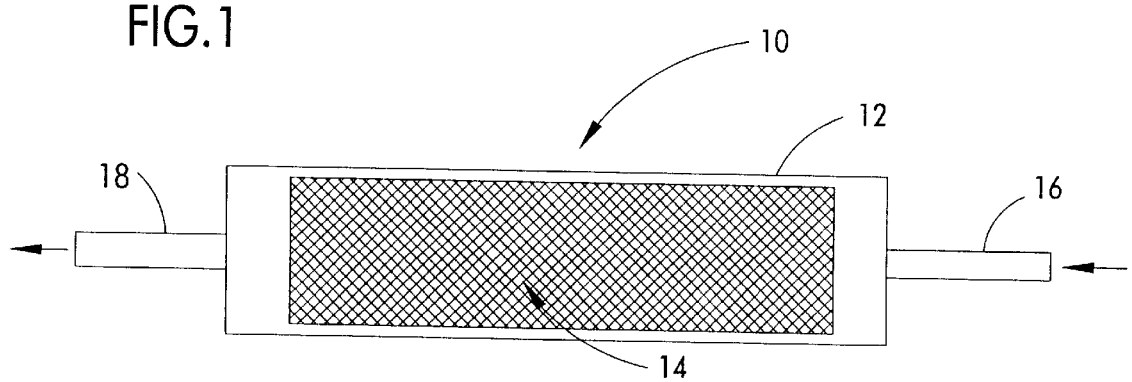
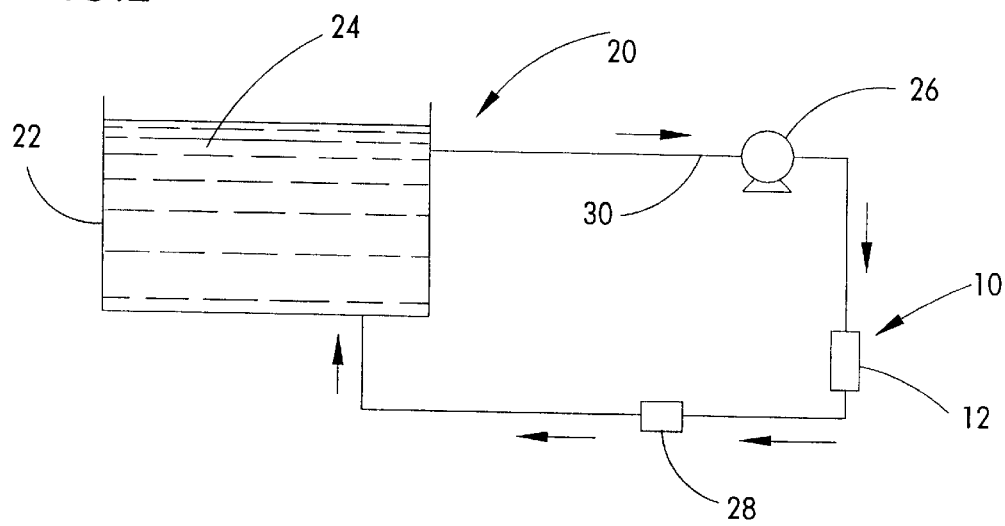

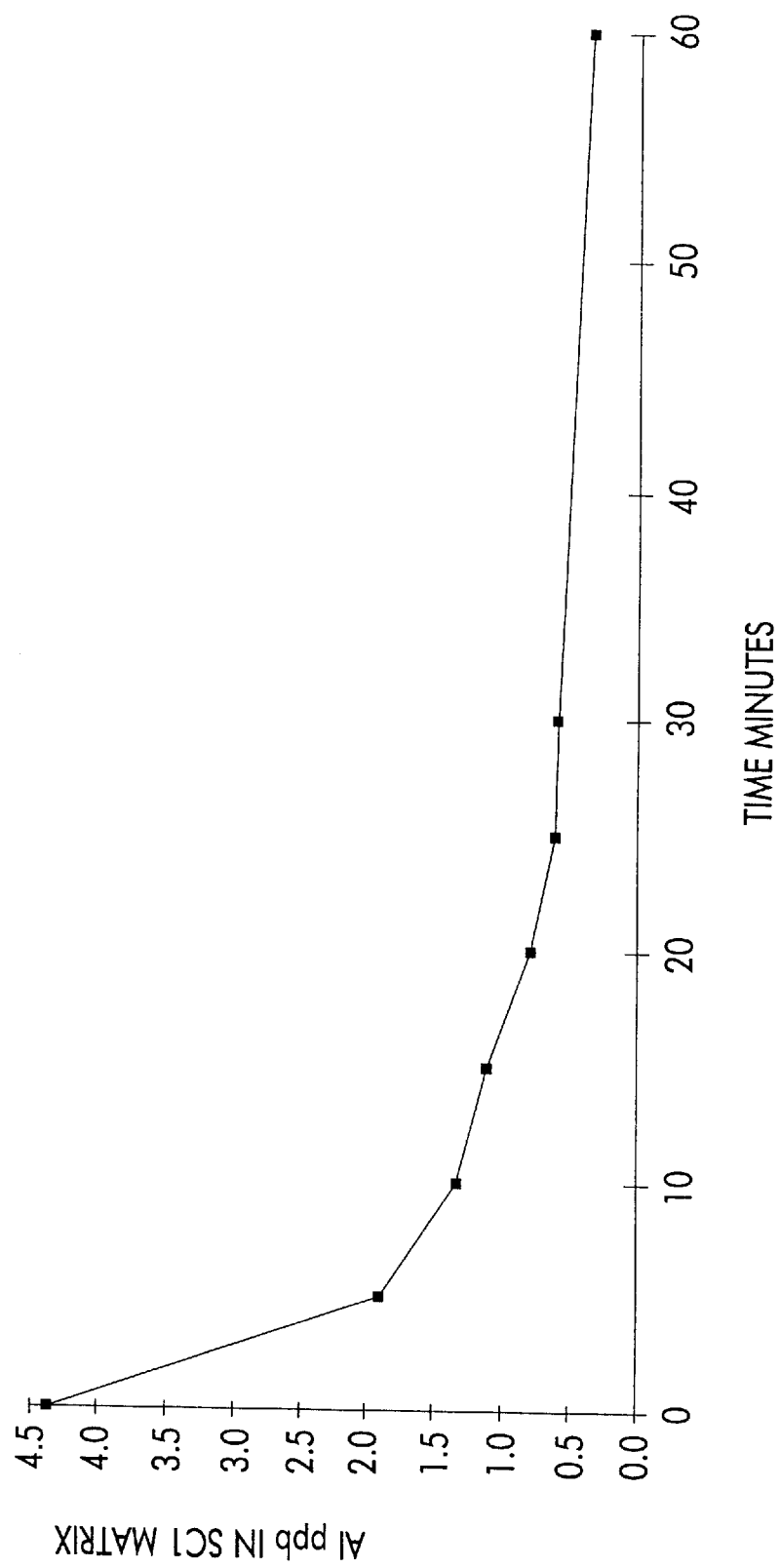

GETTERING AGENT

CROSS REFERENCE TO ORIGINAL APPLICATION

This is a continuation-in-part application of application Ser. No. 08/259,052, filed on Jun. 13, 1994, now U.S. Pat. No. 5,622,568.

BACKGROUND OF THE INVENTION

The present invention relates to the gettering of metals from a solution, and in particular, to the gettering of metals from an alkaline solution such as a semiconductor wafer cleaning solution.

The preparation of single crystal silicon wafers typically involves the steps of growing a single crystal ingot, slicing the ingot into wafers, and lapping, etching and polishing the wafers. Prior to being packaged for delivery to a customer, the polished wafers are routinely cleaned by a procedure commonly known as the RCA method developed by Kern. See W. Kern and D. Puotinen, RCA Rev. 31 (1970) 187. In this method the wafers are immersed in a series of alkaline and acidic baths. One of the alkaline baths ("SC-1") typically contains $H_2O$-$H_2O_2$-$NH_4OH$ and one of the acidic baths ("SC-2") typically contains $H_2O$-$H_2O_2$-$HCl$. SC-1 which may range from about 1000:1:1 to 1:1:1 parts by volume $H_2O$:$H_2O_2$:$NH_4OH$, removes organic contaminants and particles by both the solvating action of ammonium hydroxide and the powerful oxidizing action of hydrogen peroxide. The ammonium hydroxide also serves to complex metals such as copper, gold, nickel, cobalt, zinc and calcium. SC-2 which may range from about 1000:1:1 to 1:1:1 parts by volume $H_2O$:$H_2O_2$:$HCl$, removes alkali and transition metals, and prevents redeposition from the solution by forming soluble metal complexes. F. Shimura, *Semiconductor Silicon Crystal Technology* (Academic Press; London, England; 1989), page 189.

Although the RCA method is relatively effective for cleaning particles from the surfaces of wafers, it is not without its disadvantages; SC-1 has been identified as a source of metal contamination. Silicon wafers bathed in a SC-1 cleaning bath prepared from ultrapure solutions typically have a surface contamination of about $1 \times 10^{10}$ to about $1000 \times 10^{10}$ metal atoms per square centimeter when the cleaning bath is fresh and the surface contamination will progressively increase as the number of wafers bathed in the cleaning bath increases. For this reason, SC-2 cleaning traditionally follows SC-1 cleaning but has proven to be only marginally efficient for removing Al and Fe. Significantly, however, current leading edge applications of silicon wafers require that the total of all surface metals be less than $1 \times 10^{10}$ atoms per square centimeter. The present invention enables such metal contamination levels to be achieved.

SUMMARY OF THE INVENTION

Among the objects of the invention, therefore, may be noted the provision of a process and composition for gettering metals from an alkaline solution, and the provision of a process and apparatus for cleaning particles from the surface of a silicon wafer in which surface contamination with metals is reduced.

Briefly, therefore, the present invention is directed to a gettering agent for gettering metals from a solution. The gettering agent comprises a granule of silicon having a size greater than about 0.01 millimeter and less than 10 millimeter in diameter, a surface concentration of less than about $5 \times 10^{16}$ atoms/cm$^2$ of each of aluminum, titanium, boron, calcium, zinc, and iron in various oxidation states and a bulk concentration of less than 10 parts per billion weight/weight ratio (ppbw) of each of Al, Ti, B, Ca, Zn, and Fe. The silicon granule additionally has a surface layer of $SiO_2$ greater than 15 angstroms in thickness.

Other objects of the invention will be in part apparent and in part pointed out hereinafter.

BRIEF DESCRIPTION OF THE DRAWINGS

FIG. 1 is a schematic of an apparatus for gettering metals from a solution in accordance with the present invention; and FIG. 2 is a schematic of an apparatus for cleaning particles from the surface of a silicon wafer in accordance with the present invention.

FIG. 3 is a graph showing total aluminum content as a function of time for a solution being contacted with a gettering agent of the present invention as set forth in the Example.

DETAILED DESCRIPTION OF THE PREFERRED EMBODIMENTS

Surprisingly, it has been discovered that the metal content of SC-1 and other alkaline solutions may be reduced by contacting the solution with a bed of a gettering agent which has a surface layer of $SiO_2$. Advantageously, therefore, the metal content of SC-1 and other alkaline semiconductor wafer cleaning solutions may be reduced to less than 10 parts per trillion (atomic) thereby enabling the preparation of cleaned silicon wafers having less than $1 \times 10^{10}$ metal atoms per square centimeter on the surface thereof. The metal content of other alkaline solutions such as $NaOH$:$H_2O_2$, $KOH$:$H_2O_2$, choline:$H_2O_2$, and $(CH_3)_4NOH$:$H_2O_2$ may also be reduced in accordance with the present invention.

The process of the present invention may be used to getter any metal which is capable of forming a minimum of two covalent bonds from an alkaline solution. Such metals include iron, aluminum, calcium, titanium, and boron which are capable of building "networks" in silicon dioxide and thus, degrading the electrical characteristics of the silicon dioxide. Metals such as sodium and potassium which form purely ionic bonds to silica will not be gettered.

Referring now to FIG. 1, a gettering device 10 of the present invention for removing metals from an alkaline solution has a housing 12 which contains a bed of gettering agent 14. The solution to be purified enters the gettering device through inlet 16, flows through the bed of gettering agent 14 and exits the gettering device through outlet 18. The housing is preferably made of a non-contaminating material such as polyethylene, a fluorinated resin sold under the trade designation Teflon by Dupont (Wilmington, Dela.), polyvinylidinedifluoride ("PVDF"), or quartz. In addition, the gettering device should not be a source of particles that cannot be filtered or that would clog standard liquid particle filters that remove particles having a diameter as small as 0.01 micrometers.

For many applications such as the purification of a chemical reagent prior to use, it will only be necessary to pass the reagent through the gettering device 10 in a single pass. For other applications, however, such as the purification of a cleaning solution held in a silicon wafer cleaning tank, it is desirable to continuously purify the cleaning solution.

The gettering agent should be mechanically stable and of a size and shape that will provide a well-defined residence time and a uniform flow of solution across the cross-section of the bed of gettering agent without a significant pressure drop across the gettering device. Preferably, the gettering agent comprises a chunk or granule of silicon which is greater than about 0.01 millimeter and less than about 10 millimeter in diameter and, more preferably greater than about 0.1 millimeter and less than about 10 millimeter in diameter. As used herein, particle diameters (sizes) are determined by commercially available standard mechanical sieves and macrofiltration screens. For example, particles greater than 4 millimeter can be captured on a U.S. Standard 4 millimeter sieve while smaller particles would pass through. In the same way, particles greater than 0.105 millimeter would be captured on a 105 micron mesh macrofiltration screen. In addition, the surface area to weight ratio of the gettering agent is between about 0.001 $m^2$ per gram and about 10 $m^2$ per gram, preferably between about 0.05 $m^2$ per gram and about 1 $m^2$ per gram.

Silicon dioxide reacts with aqueous ammonia (frequently referred to as $NH_4OH$) to form ammonium silicate. For example, the maximum etch rate is approximately 0.1 angstroms per minute in a conventional SC-1 solution at room temperature. Over time, therefore, alkaline solutions such as SC-1 will completely dissolve the native silicon dioxide and, if the silicon dioxide is on the surface of free-flowing granular semiconductor grade polysilicon, it may eventually cause the disintegration of granular polysilicon. Accordingly, the $SiO_2$ surface layer preferably should have a thickness which is greater than that of the native oxide which forms on silicon during oxidation in air or during chemical oxidation in oxidizing reagents such as $H_2SO_4/H_2O_2$ mixtures, $H_2SO_4/HNO_3$ mixtures, $NH_4OH/H_2O_2$ mixtures and gaseous or aqueous ozone (about 5–15 angstroms) to strike a balance between gettering capability and oxide dissolution. The oxide layer thickness is thus at least about 15 angstroms, preferably at least about 20 angstroms, more preferably at least about 50 angstroms, still more preferably at least about 75 angstroms, still more preferably at least about 100 angstroms, still more preferably at least about 500 angstroms, and in a preferred embodiment at least about 1,000 angstroms. While oxide layers having a thickness in excess of 5,000 angstroms may be used, the additional benefit obtained by having an oxide layer of this thickness typically will not justify the amount of time and effort required to grow an oxide layer to this thickness. Thus, the thickness of the oxide layer will generally be within the range of about 15 and about 5,000 angstroms.

So that the gettering agent is not itself a source of contamination, the gettering agent should have a relatively low concentration of metals. That is, the gettering agent should contain no more than about 10 parts per billion weight/weight ratio (ppbw) of aluminum, titanium, boron, calcium, zinc and iron and collectively no more than about 60 ppbw of these metals. Preferably, the surface of the gettering agent contains less than about $5 \times 10^{16}$ atoms/$cm^2$ of each of these metals and collectively no more than about $30 \times 10^{16}$ atoms/$cm^2$ of these metals. More preferably, the gettering agent comprises semiconductor grade polycrystalline silicon which contains less than about $2 \times 10^{16}$ atoms/$cm^2$ of each metal and collectively no more than about $12 \times 10^{16}$ atoms/$cm^2$ of these metals.

The surface layer of silicon dioxide may be grown, for example, by exposing polycrystalline silicon to an oxygen-containing atmosphere, such as pure oxygen, oxygen/hydrogen mixtures, or oxygen and an inert gas such as helium or argon, at a temperature in the range of about 500° C. to about 1300° C., preferably about 700° C. to about 1,100° C. In a preferred embodiment, the oxide is grown by exposing the polycrystalline silicon to an atmosphere of about 40% oxygen by volume and about 60% hydrogen at a temperature of about 900° C. for about 2–4 hours. The growth rate of the oxide layer may be accelerated by the presence of a few percent of water vapor in the oxygen containing atmosphere. In a preferred embodiment, the water vapor would be at least 1% by volume and more preferably about 5% by volume.

In a particularly preferred embodiment, the gettering agent has a size between about 0.01 millimeters and 0.5 millimeters and is a free-flowing, granular semiconductor grade polysilicon having a surface layer of silicon dioxide. Free-flowing, granular polysilicon of this size may be prepared, for example, from tiny silicon seed particles which are fluidized in a monosilane/hydrogen mix. See, e.g., F. Shimura, *Semiconductor Silicon Crystal Technology* (Academic Press; London, England; 1989), page 120 and the references cited therein. Alternatively, free-flowing granular polysilicon of this size is commercially available from Ethyl Corporation (Baton Rouge, La.) and from Texas Instruments (Dallas, Tex.). Polysilicon from Ethyl Corporation typically has a size range from 0.12 millimeter to 2.5 millimeter with an average of about 0.8 mm. The density is about 1.5 grams/cc and the free space volume is about 35%. The average surface area per gram is about 0.1 $m^2/g$. Typical metal concentration is less than 5 ppbw for aluminum, titanium, boron, calcium, zinc and iron and most frequently less than 2 ppbw per metal. Surface metals are typically less than $5 \times 10^{16}$ atoms/$cm^2$ of each metal and most frequently less than $2 \times 10^{16}$ atoms/$cm^2$ of each metal.

Referring to FIG. 2, an apparatus for continuous purification of a solution held in a tank is schematically depicted. All materials of construction, like those of the gettering device 10, should be non-contaminating. The apparatus, generally designated by reference numeral 20, includes a tank 22 for the solution 24. The apparatus additionally includes a recirculation loop which comprises pump 26, gettering device 10 and filter 28 connected by tubing 30. Upon the energization of pump 26, solution 24 is withdrawn from tank 26, caused to flow in the direction of the arrows through gettering device 10 and filter 28 and returned to tank 22.

In a preferred embodiment of the silicon wafer cleaning operation, a cassette or cassettes holding a plurality of wafers, e.g., 100 wafers, is immersed into a cleaning tank which contains approximately 2 to 80 liters of a flowing SC-1 cleaning solution. The SC-1 cleaning solution contains about 1000:1:1 to 1:1:1 parts by volume $H_2O:H_2O_2:NH_4OH$, preferably about 100:1:1 to about 5:1:1 parts by volume $H_2O:H_2O_2:NH_4OH$, (supplied as 30–35 wt % $H_2O_2$ in water and 28–30 wt % $NH_4OH$ in water) and has a temperature of about 0° C. to about 100° C., preferably about 25° C. to 90° C. Metals are gettered from the cleaning solution by withdrawing the SC-1 cleaning solution at a rate of approximately 0.4 liters per minute to 40 liters per minute, preferably about 7–22 liters per minute. The withdrawn solution is caused to flow through a gettering device which contains about 10 milliliters to about 10 liters, preferably about 1 liter of free-flowing, granular semiconductor grade polysilicon which has a surface layer of silicon dioxide, preferably about 1000 Å grown thereon; the flow rate of SC-1 through the gettering device should be sufficient to maintain the total concentration of SC-1 cleaning solution in the tank of aluminum, titanium, boron, calcium, zinc and iron of less than 100 parts per trillion by weight to volume ratio (ppt) each, preferably less than 10 ppt. Before being returned to the cleaning tank, SC-1 cleaning solution exiting the gettering device is filtered using, for example, a Pall Super Cheminert™ all-Teflon fluorocarbon filter which is rated to remove greater than 90% of all particles larger than 0.10 millimeter diameter from heated SC-1 mixtures. To minimize clogging of the filter, the gettering device should contain a minimum of gettering agent particles having a size of less than about 0.1 micrometers.

Methods for determining the metal content of alkaline solutions such as SC-1 and for determining the surface and bulk metal contamination of silicon are well known to those of ordinary skill. For example, the metal content of solutions may be determined as set forth in Marshall, J., Carroll, J., Crighton, J., and Barnard, C.L>R., *J. of Anal. Atomic Spec.*, 8, 337R (1993), the surface metal content of silicon may be determined as set forth in Ruth, K., Schmidt, P., Coria, J., and Mori, B., *Proceedings of the ECS Fall Meeting*, Electrochemical Society 1993 (Vol. II) p. 488, and the bulk metal content of silicon may be determined as set forth in Chu, C.C., Chen, P.Y., Yang, M.H., and Alfassi, Z., *Analyst, 115*, 29 (1990), the disclosures of which are incorporated herein by reference.

The following Example illustrates the invention.

EXAMPLE

A solution of 1:4:20 $NH_4OH:H_2O_2:H_2O$ was intentionally contaminated with more than 4 ppb(w/v) of aluminum using a standard aluminum solution. This solution was contacted with a fixed bed of air-oxidized polysilicon granules (Ethyl Corporation) having a size range from 0.12 millimeter to 2.5 millimeter with an average of about 0.8 millimeter. Samples of the solution were pulled on a periodic basis to determine the amount of total aluminum (dissolved plus suspended) remaining in the SC-1 mixture. FIG. 3 shows total aluminum content as a function of time. Aluminum content decreased to 1/10th its original value in less than 60 minutes.

While certain representative embodiments and details have been shown for the purpose of describing the invention, it will be apparent to those skilled in the art that various changes and modifications may be made therein without departing from the scope of the invention.

What is claimed is:

1. A process for preparing a gettering agent, the process comprising growing a silicon dioxide layer on the surface of a granule of polycrystalline silicon having a size greater than about 0.01 millimeter and less than about 10 millimeters in diameter at a temperature of at least about 500° C. in an oxygen containing atmosphere.

2. The process of claim 1 wherein the temperature is at least about 700° C.

3. The process of claim 1 wherein the temperature is in the range of about 700° C. to about 1,100° C.

4. The process of claim 1 wherein the oxygen containing atmosphere contains water vapor.

5. The process of claim 1 wherein the oxide layer is grown at a temperature of about 900° C. in an atmosphere containing about 40% oxygen by volume and about 60% hydrogen by volume for about 2–4 hours.

6. The process of claim 1 wherein the oxygen containing atmosphere contains at least 1% to about 5% water vapor by volume to accelerate the growth rate of the oxide layer.

7. The process of claim 1 wherein the oxygen containing atmosphere contains about 5% water vapor by volume to accelerate the growth rate of the oxide layer.

* * * * *